No. 680,949. Patented Aug. 20, 1901.
C. A. P. TURNER.
CRYSTALLIZER.
(Application filed Apr. 15, 1901.)

(No Model.)

WITNESSES
E. J. Staude
W. E. Cooley

INVENTOR
CLAUDE A. P. TURNER
BY Paul & Hawley
HIS ATTORNEYS

UNITED STATES PATENT OFFICE.

CLAUDE A. P. TURNER, OF MINNEAPOLIS, MINNESOTA.

CRYSTALLIZER.

SPECIFICATION forming part of Letters Patent No. 680,949, dated August 20, 1901.

Application filed April 15, 1901. Serial No. 55,863. (No model.)

*To all whom it may concern:*

Be it known that I, CLAUDE A. P. TURNER, of Minneapolis, Hennepin county, Minnesota, have invented certain new and useful Improvements in Crystallizers, of which the following is a specification.

This invention relates to improvements in crystallizers, such as are used in the sugar-making process; and the object I have in view is to provide a crystallizer of improved construction and one that shall be simple and economical to manufacture.

The invention consists generally in the constructions and combinations hereinafter described, and particularly pointed out in the claims.

Figure 1:
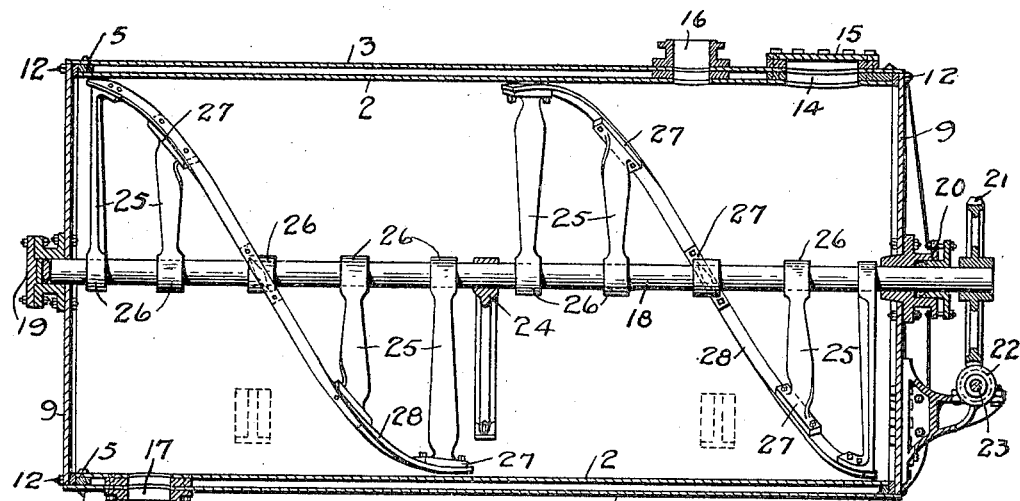
Figure 3:
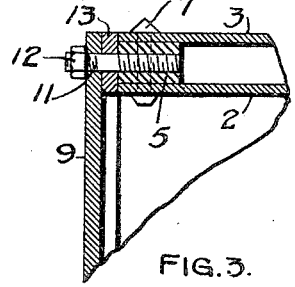
Figure 4:
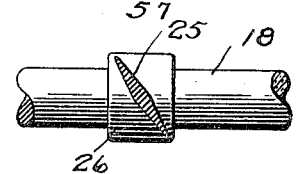
Figure 2:
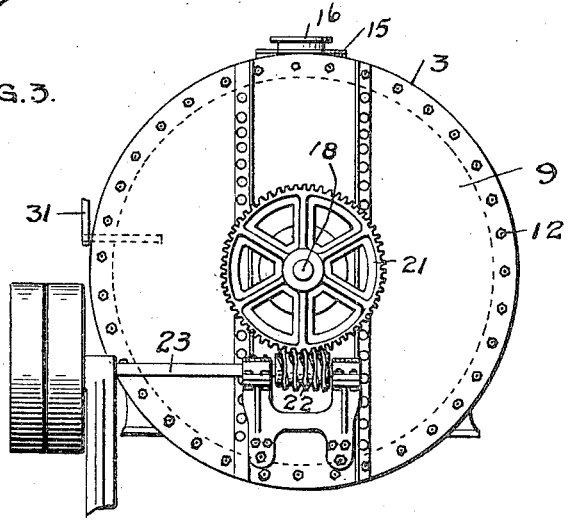

In the drawings, Figure 1 is a longitudinal vertical section of a crystallizer embodying my invention. Fig. 2 is an end elevation. Fig. 3 is a detail illustrating the manner of securing the head to the cylinder. Fig. 4 is a detail illustrating the construction of one of the arms by which the scraper is supported.

In the accompanying drawings, 2 represents the inner shell, and 3 the outer shell, of a horizontal cylinder or drum which is supported in any suitable manner and which forms the crystallizing receptacle or vessel. Arranged between the shells 2 and 3, at the ends thereof, are the rings 5, which close the space between the shells and which are preferably secured in position by suitable rivets 7, which pass through the shells and through said ring 5. (See Fig. 3.) The outer edge of each ring is flush with the ends of the shells. A cylindrical head 9 closes each end of the drum and is preferably secured in position by means of suitable bolts 11, which engage the ring 5, pass through the holes in the head, and are provided with the nuts 12. A wooden or other suitable gasket 13 is arranged between each head and the end of the drum, covering the end of each shell and the outer edge of the ring 5. (See Fig. 3.) By this means I secure a close joint between the head of the cylindrical wall of the drum with a very simple and inexpensive construction. At the same time the means thus provided stiffens the end of the cylinder and closes the space between the two shells. For the purpose of regulating the temperature of the crystallizing vessel means may be provided for circulating exhaust-steam through the space between the two shells of the vessel. The vessel is preferably provided with a suitable manhole 14, having a cover 15, with an inlet-opening 16 and an outlet 17. These parts may be of any ordinary or preferred construction. A shaft 18 is mounted centrally in the drum or vessel and is capable of rotation in its bearings. The vessel is provided with suitable stuffing-boxes 19 and 20 for the purpose of making a close joint around said shaft. This shaft is preferably provided with the gear-wheel 21, which is adapted to be driven by a worm 22 upon a driving-shaft 23. The shaft 18 extends centrally through the drum, and I prefer to provide at about the center of the drum a bearing or support 24 for said shaft. Upon the shaft 18 I arrange a series of stirrer-arms 25. These arms are provided with hubs 26, by means of which they are secured rigidly to the shaft 18. The main part of each arm 25 is arranged diagonally to the shaft 18, substantially after the manner of the blade of a propeller-wheel. (See Fig. 4.) These arms are preferably formed of cast metal, and they may be secured to the shaft in any suitable manner. These arms serve to thoroughly mix the material being operated upon, and the arms in the opposite portions of the drum are oppositely arranged, so that each set of arms or blades tends to move the material toward the center of the drum. I also prefer to provide a suitable scraper 28, consisting of a spiral bar secured to the ends of the arms 25 and arranged to move edgewise through the material. This scraper is arranged in close proximity to the inner surface of the drum and tends to cut or scrape any adhering crystals from the inner surface of the drum. For the purpose of securing the scraper to the outer ends of the stirrer arms or blades I prefer to provide said arms with the diagonally-arranged heads 27. The blade 28 has its broad side secured to these arms, and it is arranged close to the surface of the drum, and as it moves edgewise through the material it acts simply as a cutter or scraper to prevent the adhesion of any material to the inner surface of the drum. The arms or blades 25 serve to stir or mix the masse-cuite in the process of making sugar, and they constantly move said material along in the drum from the ends toward the center thereof. The bar 28 is arranged to move edgewise through the material, and as this bar is very thin it does not interfere with the stirring operation, which is performed by said inclined arms or blades, and as the scraper moves very easily through the material, owing to the fact that it is arranged to move edgewise, there is little increase in power required to operate the machine over what would be necessary if the scraper were not present. A suitable thermometer 31 may, if preferred, be arranged in the wall of the drum to indicate the temperature of its interior.

I claim as my invention—

1. The combination, with the cylindrical drum, of the shaft 18, mounted in bearings in said drum and extending through the center thereof, the series of diagonally-arranged mixer-arms secured upon said shaft, and the spiral scraper-bar secured upon said arms and arranged with its flat side toward the shaft to move edgewise through the material as said shaft is rotated, for the purpose set forth.

2. The combination, with the cylindrical drum, of a rotatable shaft extending centrally through said drum, a series of cast-metal propeller-blade arms secured upon said shaft and arranged diagonally thereto, and a spiral scraper-bar secured upon said arms and arranged with its flat side toward the shaft to move edgewise through the material, for the purpose set forth.

3. The combination, with the cylindrical drum, of the rotatable shaft extending centrally through said drum, oppositely-arranged series of propeller-blade arms secured upon said shaft and located in the opposite parts of said drum, and the spiral scrapers 28 secured upon said propeller-blade arms and arranged with its flat side toward the shaft to move edgewise through the material as said shaft is rotated.

In testimony whereof I have hereunto set my hand, this 11th day of April, 1901, at Minneapolis, Minnesota.

CLAUDE A. P. TURNER.

In presence of—
A. C. PAUL,
M. E. GOOLEY.